(12) United States Patent
Martin (10) Patent No.: US 11,084,603 B2
(45) Date of Patent: *Aug. 10, 2021

(54) BRAKE KEY SCREW REMOVAL SYSTEM AND DEVICE

(71) Applicant: US Gov't, by the Secretary of the Navy, Quantico, VA (US)

(72) Inventor: Timothy Porter Martin, Maple Hill, NC (US)

(73) Assignee: The Government of the United States of America, as represented by the Secretary of the Navy, Quantico, VA (US)

(*) Notice: Subject to any disclaimer, the term of this patent is extended or adjusted under 35 U.S.C. 154(b) by 65 days.

This patent is subject to a terminal disclaimer.

(21) Appl. No.: 16/371,666

(22) Filed: Apr. 1, 2019

(65) Prior Publication Data

US 2019/0225352 A1 Jul. 25, 2019

(51) Int. Cl.
*B64F 5/40* (2017.01)
*F16D 65/00* (2006.01)

(52) U.S. Cl.
CPC .......... *B64F 5/40* (2017.01); *F16D 65/0043* (2013.01)

(58) Field of Classification Search
CPC ........ B64F 5/40; F16D 65/0043; B64C 25/44; B64C 25/36
See application file for complete search history.

(56) References Cited

U.S. PATENT DOCUMENTS

| | | | | |
|---|---|---|---|---|
| 4,123,838 | A * | 11/1978 | Magavero | B25B 27/023 29/261 |
| 4,196,761 | A | 4/1980 | Royer | |
| 5,033,180 | A * | 7/1991 | Colson | B25B 27/062 29/259 |
| 5,951,554 | A | 9/1999 | Holmes | |
| 6,665,921 | B2 * | 12/2003 | Winterfeldt | B25B 27/023 29/256 |
| 2019/0217452 | A1 * | 7/2019 | Martin | B25B 13/481 |

* cited by examiner

*Primary Examiner* — John C Hong
(74) *Attorney, Agent, or Firm* — Timothy James Slabouz (57) ABSTRACT

The invention's structure provides a device for removing stuck brake key screws from an aircraft's landing gear's wheels. The device generally comprises a base bottom, right and left side arms, a threaded rod, and a screw driver bit holder. The curvature of the base bottom preferably matches the curvature of a wheel hub opposite to the location of a stuck screw. When operationally used, the device provides for optimal or virtually optimal engagement of the device with the head of a screw to be removed.

10 Claims, 7 Drawing Sheets

BRAKE KEY SCREW REMOVAL SYSTEM AND DEVICE

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

CROSS REFERENCE TO RELATED APPLICATIONS

The current application claims the benefit of U.S. Non-Provisional application Ser. No. 16/369,506, titled "BRAKE KEY SCREW REMOVAL SYSTEM, DEVICE, AND METHOD OF USE", which was filed on 29 Mar. 2019, and which is hereby incorporated by reference.

COPYRIGHT NOTICE

A portion of the disclosure of this document may contain materials that are subject to copyright protection. The copyright owner has no objection to a single reproduction by anyone of this document or disclosure as it appears in the Patent and Trademark Office patent file or records, but otherwise reserves all copyright rights whatsoever.

BACKGROUND OF THE INVENTION

1. Field of the Invention

The present invention is directed, in general, to a screw removal system, device, and method for providing a reliable means of removing screws that are difficult to remove through the use of standard tools. More particularly, but without limitation, this invention preferably relates to a screw removal system that includes a device (known as The Martin) that provides for optimal or virtually optimal engagement of the device with the head of a screw to be removed, and which, it is the inventor's belief, allows for the virtually optimal transmission of screw removal torque to a screw. Still more specifically, the invention relates to a system, device and method for removing aircraft brake key screws including without limitation, to the brake key screws on landing gear wheel halves used by the United States Marine Corps (and other U.S. Government agencies) on, or with, MV-22 (and, possibly, other V-22 variant) aircraft.

2. Description of the Background Art

The ability to remove screws that are in hard to reach locations, or are not in the best condition, can make the successful removal of these screws using conventional screw removal tools, e.g., a standard or powered screw driver, problematic and can lead to the stripping of the screw head or the breaking of the screw itself, which in many cases leads to drilling out the damaged/broken screw and can lead to damaging the threaded hole. This leads to the need for replacement parts and extra effort, which is an inefficient use of resources including manpower. The invention provides a cost-effective, easy-to-use system, device, and method as an alternative to using standard screw removal tools, and, it is the inventor's belief, this invention can eliminate, or at least reduce, screw damage and the resulting inefficiencies.

Currently, the removal of screws in hard to reach locations is accomplished using a variety of tools or methods. As examples, a web hit associated with a web search for "how to remove screws that are barely accessible" provided for the use of: an offset screwdriver; a Phillips-head or slot bit, properly sized for the screw head, held by vise grips, which are then rotated/turned in the proper removal direction; the use of an appropriately sized bit used in and/or with a ratchet wrench; and etc. (see, https://diy.stackexchange.com/questions/21400/how-to-unscrew-screws-that-are-barely-accessible). In a somewhat related search to cover stuck screws, or screws with damaged heads, the following method steps were disclosed as part of the removal process: 1. Switch screwdrivers; 2. If the screw is partially stripped, attempt to remove it with a different, better screw head-mated screwdriver; 3. Tap the screwdriver into the screw head with a hammer; 4. Remove the screw with a pair of pliers; and 5. If the previous steps do not work drill out the screw using an extractor bit.

With respect to patented systems and devices, U.S. Pat. No. 5,951,554A, to Holmes, discloses a screw removal system that includes a screw bonding component and a T-handle for rotating a threaded shaft to engage the bonding component with the screw head, and once the bonding component is engaged the T-handle can be rotated in the direction to remove the screw. Other alternatives that provide or attempt to provide for improved screw removal include: U.S. Pat. No. 4,196,761, to Royer, which, in general, discloses a screw driver with a retractable lever member, said lever member being adapted, when moved to its extended position, to yield increased leverage for the user so as to improve the turning movement in the process of either tightening or loosening a screw or other similar object.

It is Applicant's belief, based on Applicant's experiences as a United States Marine Corps MV-22 hydraulic and tire shop mechanic, which included the Applicant being required to disassemble and assemble Main Landing Gear wheels, which, in turn, included the removal and installation of new brake keys when the keys were worn, and the associated screws which keep the brake keys attached to the wheel halves. The Applicant was also required to work in his Marine Corps unit's Machine Shop, where he was required to drill out and remove stripped brake key screws which were stripped in the failed attempts to successfully remove the screws in the tire shop. Because of this, the inventor had firsthand experience in the attempts of removing the screws by the tire shop using traditional methods, e.g., using traditional tools, as well as his experience in being required to drill the screws out after the screws had been stripped. All of which contributed to the creation of the subject invention.

Therefore, while the above-described, non-subject invention devices, methods and/or systems may provide means for removing screws, there is still a present need to provide a portable, compact, lightweight, inexpensive and easy-to-use system, device and/or method that provides for a virtually optimal screw removal of, without limitation, brake key screws on MV-22 landing gear wheel halves.

SUMMARY OF THE INVENTION

The present invention is a screw removal system that includes a device that provides for optimal or virtually optimal engagement of the device with the head of a screw to be removed, and which, it is the inventor's belief, allows for the virtually optimal transmission of screw removal torque to a screw.

More specifically, the present invention is a system that includes a device for removing screws, and more specifically, but without limitation, removing brake key screws on MV-22 landing gear wheel halves.

(Throughout this disclosure, and based on context, Applicant will use the following words interchangeably to refer to the invention: system, device, and tool.)

In general, the present invention provides a solution to prevent the stripping of the subject screw heads; and, therefore, eliminates the need for drilling/tapping out and replacing the damaged/broken screw. In general, a non-limiting embodiment of the invention provides this solution by being capable of being positioned in the wheel so that the base end of the device is located on the inner surface of the wheel opposite the screw to be removed, and the screw removal bit, which is inserted in the bit holder of the device, is helically advanced to engage and provide an optimal force on the slot of the screw head of the screw to be removed.

It is a feature of the Applicant's invention to provide a device and system that will allow for the removal of screws that may be difficult to remove due to the location of the screw and the inability to use standard tools to remove the screws.

It is an additional feature of the Applicant's invention to provide a device and system that decreases the likelihood to damage the subject screws, and, therefore, decreases the likelihood to require drilling out of any damaged screws, which, in turn, will decrease the likelihood of causing screw hole (thread) damage as well.

Additional features and advantages of the invention will be set forth in the description which follows, and, in part, will be apparent from the description and other parts of the disclosure of the presently described embodiments including the drawings, or may be learned from the practice of the invention. Therefore, other features and advantages of the invention will be realized and attained by the device and system, and method, particularly described in the written description, the drawings, and other portions of this disclosure. Moreover, it is to be understood that the foregoing general and the following detailed descriptions are exemplary and explanatory and are intended to provide further explanation of the invention as claimed.

BRIEF DESCRIPTION OF THE SEVERAL VIEWS OF THE DRAWING

In order to better understand the invention and to see how the same may be carried out in practice, non-limiting preferred embodiments of the invention will now be described with reference to the accompanying drawings, in which.

DETAILED DESCRIPTION OF THE INVENTION

Certain embodiments of the present invention will now be described more fully hereinafter with reference to the accompanying drawings, in which some, but not all embodiments of the invention are shown. Indeed, embodiments of the invention may be in many different forms and thus the invention should not be construed as limited to the embodiments set forth herein; rather these embodiments are provided as illustrative examples only. Furthermore, like numbers refer to like elements throughout, and the use of the abbreviation Fig. (or Figs.) will be used to identify Figures. Also, the views shown in the figures are reduced in magnification, i.e., not actual size.

It will be readily understood that the components of the embodiments as generally described and illustrated in the drawings herein could be arranged and designed in a wide variety of different configurations. Thus, the following more detailed description of the certain described embodiments of the system, device and method of use of the present invention, as represented by the drawings, is not intended to limit the scope of the invention, as claimed, but are merely representative of embodiments of the invention.

Figure 1A:
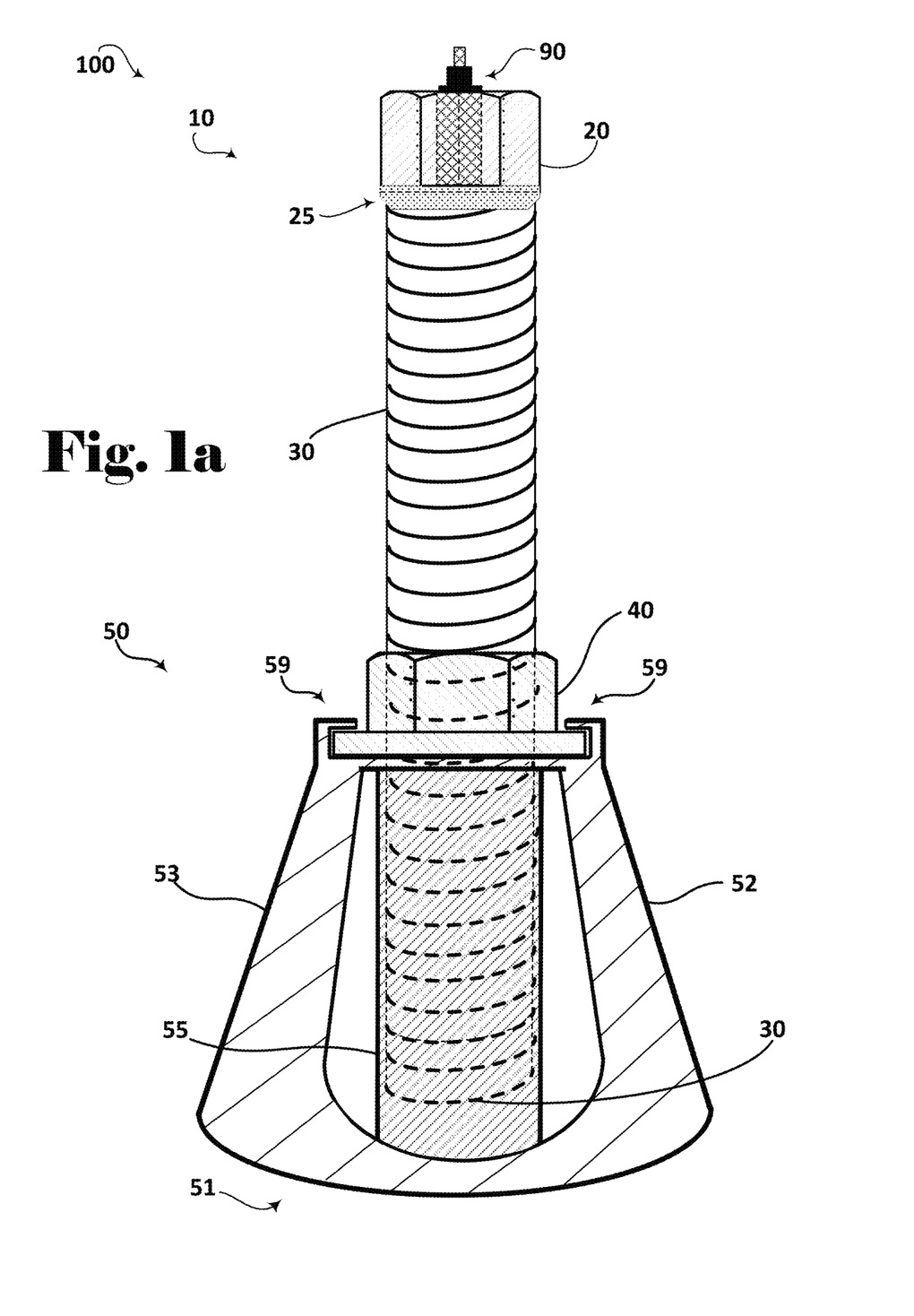
FIG. 1a is a front (or back) view of the device with a screw bit inserted into the device to form the system in accordance with a preferred embodiment of the present invention device.

It is Applicants' belief that this invention is capable of being used in spaces that would hinder the effective use of standard screw removal tools. Referring now to the drawings, and more particularly to FIG. 1a, and FIGS. 3a through 3d, there is shown a non-limiting example of a view of the inventive device 10 (in FIG. 1a), and the individual parts that make up the device (in FIGS. 3a through 3d). More specifically, the device 10 is comprised of: the device base 50 having a base bottom 51, right and left support arms 52 and 53 respectively, a storage compartment 55 (to receive the threaded rod 30 when the threaded rod 30 is helically retracted), and a bracket 59 for holding a coupling nut 40; a threaded rod 30; and a bit holder 20. The inventive system 100 is comprised of: the device 10; and a screw driver bit 90. Preferably the device base bottom 51 is formed to have the same curvature as the inner surface of the Wheel Hub Half 300 (shown in FIG. 2a, FIG. 2b, and FIG. 2c). Preferably the threaded rod 30 is made of an appropriate metallic material, but may be manufactured using high impact plastics, composites or other appropriate, commercially available material. The threaded rod 30 preferably uses a standard machine screw thread, but any other thread design can be used as long as the threads of the threaded rod 30 match the threads of the coupling nut 40, (and the bit holder 20 if the bit holder 20 is at least partially threaded). In one embodiment the threaded rod 30 threads match the brake key screw 150 threads (shown in FIG. 2a). The device base 50 is preferably made of engineering plastic, e.g., Delrin®, Acetal, etc., to prevent marring of the wheel hub, but any other polymer, composite or metallic material of sufficient strength and having other engineering characteristics appropriate to the purpose of the invention can be used. Preferably, the threaded rod storage compartment 55 is machined or formed to be smooth so the threaded rod can be spun freely. The bit holder 20 is preferably a standard size, hex-shaped bit holder 20 for use with a one-quarter inch hex-shank screw driver bit 90, which are well known and customarily used by mechanics, and are commercially available. However, other shank sizes for both the bit holder and the screw driver bit can be used. The screw driver bit 90 shown in FIG. 1a is a slot type bit, but any other bit type, e.g., hex, Torx, Phillip's head, or etc., of a screw driver bit can be used to match the screw head of the screw to be removed. Exclusively referring to FIG. 1a, it is shown that the bit holder 20 is attached to the threaded rod 30, preferably by using a bonding means 25 capable of securely attaching the bit holder 20 to the threaded rod 30—such bonding means may include, without limitation, Loctite or other similar adhesive or bonding compound appropriate for the application including consideration of whether the threaded rod 30 is made of metal or plastic—though some compounds/adhesives may provide the same or similar properties and results for creating the attachment. Moreover, if the bit holder 20 and the threaded rod 30 are both metallic they could be securely attached to each other through the use of well-known welding processes. In another embodiment the bit holder 20 is partially threaded to allow the threaded rod 30 to be threaded into a bottom portion of the bit holder 20 (i.e., the bottom is the side opposite the side, i.e., bit holder 20 top, used to insert the screw driver bit 90 into the bit holder 20. Also, FIG. 1a shows that the threaded rod 30 can be retracted into the storage compartment 55.

Figures 1B, 1C:
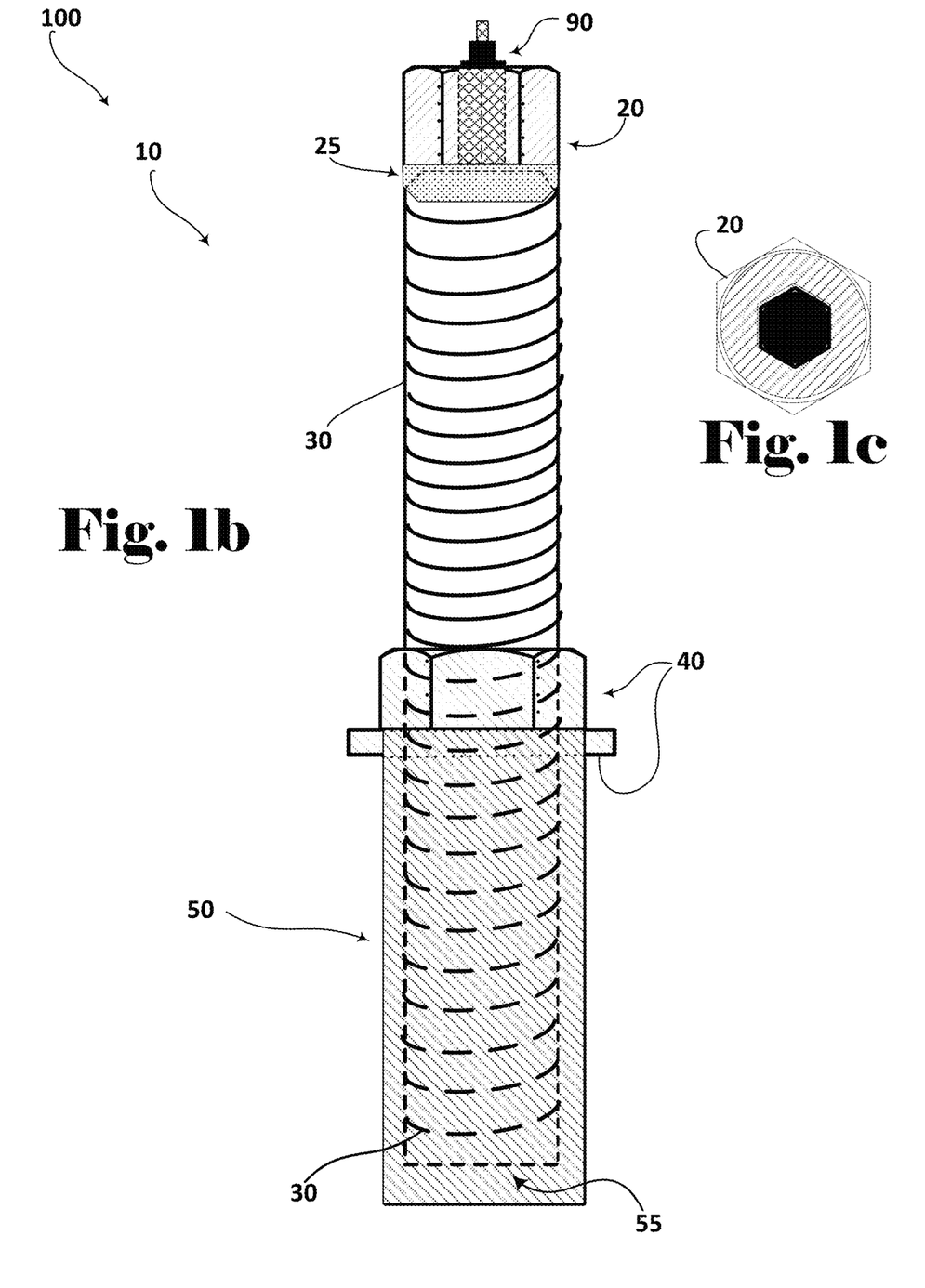
FIG. 1b is a side view of the device with a screw bit inserted into the device to form the system in accordance with a preferred embodiment of the present invention device.
FIG. 1c is a top view of the bit holder portion of the device in accordance with a preferred embodiment of the present invention device.

Referring now to FIG. 1b, a side view of the device 10 with an inserted screw driver bit 90 (that together form the system 100) is shown. Referring now to FIG. 1c, a top view of the bit holder 20 having a hex-shaped center portion of the bit holder 20 is shown. This center portion is the base upon which the bottom of the hex-shank screw driver bit 90 (i.e., the side opposite the screw driver tip end of the screw driver bit 90) operationally sits upon insertion of the shank of the screw driver bit 90 into the bit holder 20.

Figure 2A:
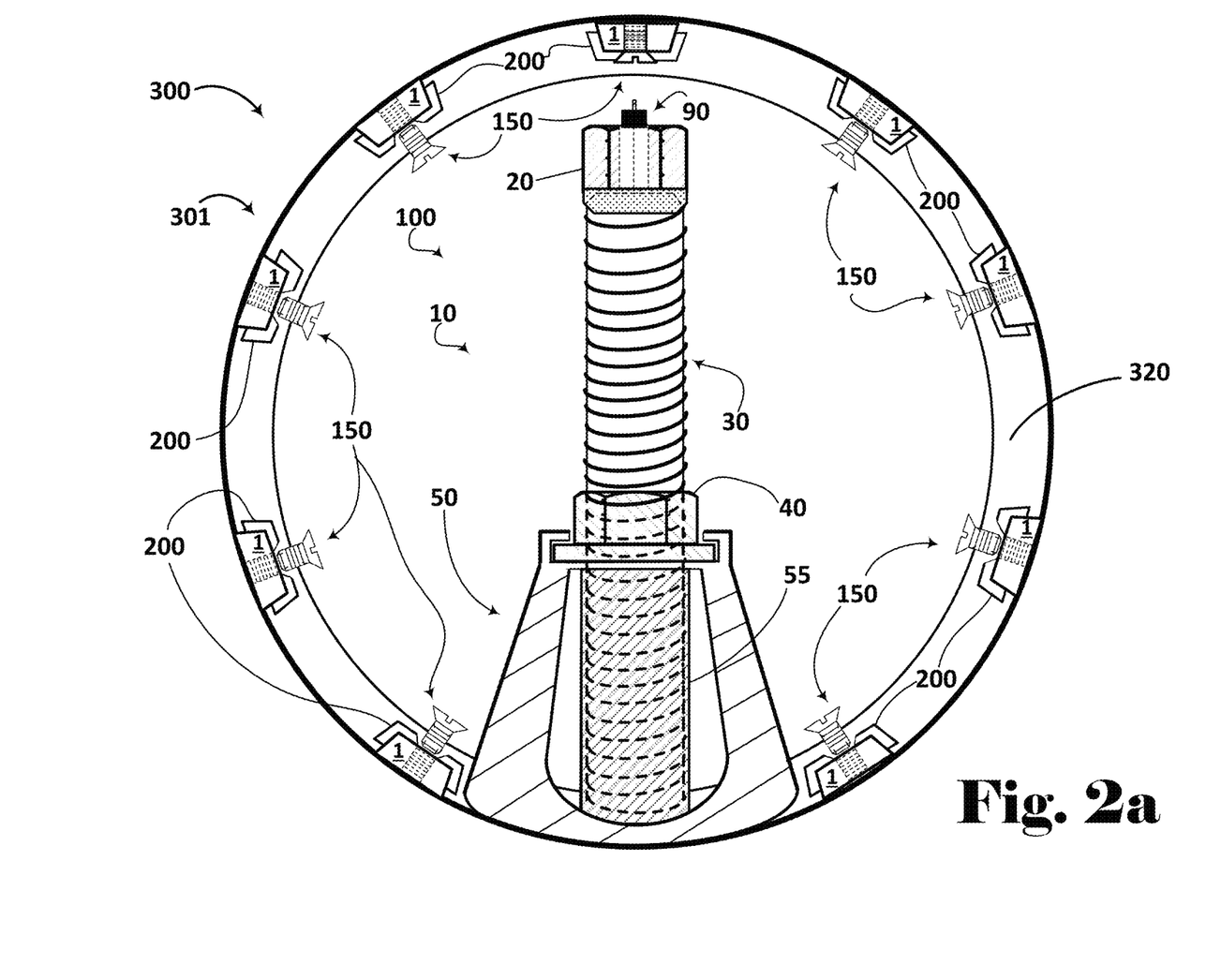
FIG. 2a shows a reduced magnification of the top view of the device when inserted in an aircraft's landing gear wheel hub half and is positioned prior to operating the device to helically advance and cause the engagement of the screw bit with the screw head slot in accordance with a preferred embodiment of the present invention. (NOTE: only the upper portion of the wheel hub half is shown, i.e., FIG. 2a excludes the lower ledge portion, the hex bolts and the smaller inner opening at the bottom of the wheel hub half (all of which are shown in FIG. 2b).

Referring now to FIG. 2a, without limitation, the following is a discussion of an embodiment of the present invention device 10 and system 100. Preferably, but without limitation, the device 10 and system 100 are used to remove screws from aircraft landing gear wheel hub halves, and, more specifically, those used on MV-22 aircraft. Still referring to FIG. 2a, the following are a listing of some of the items relevant to the operational use of the subject invention: A Wheel Hub Half 300; Brake Key Mount(s) 1; Brake Key(s) 200; and Brake Key Screw(s) 150. The Brake Key Mounts 1 are manufactured portions of the Wheel Hub Half 300, and operationally each individual Brake Key 200 is attached to each individual Brake Key Mount 1 through the use of a Brake Key Screw 150. (NOTE: only the upper portion of the Wheel Hub Half 300 is shown, i.e., FIG. 2a excludes the lower ledge 320 portion, the hex bolts 310 and the smaller inner opening 305 at the bottom of the wheel hub half (all of which are shown in FIG. 2b and FIG. 2c).

Figure 2B:
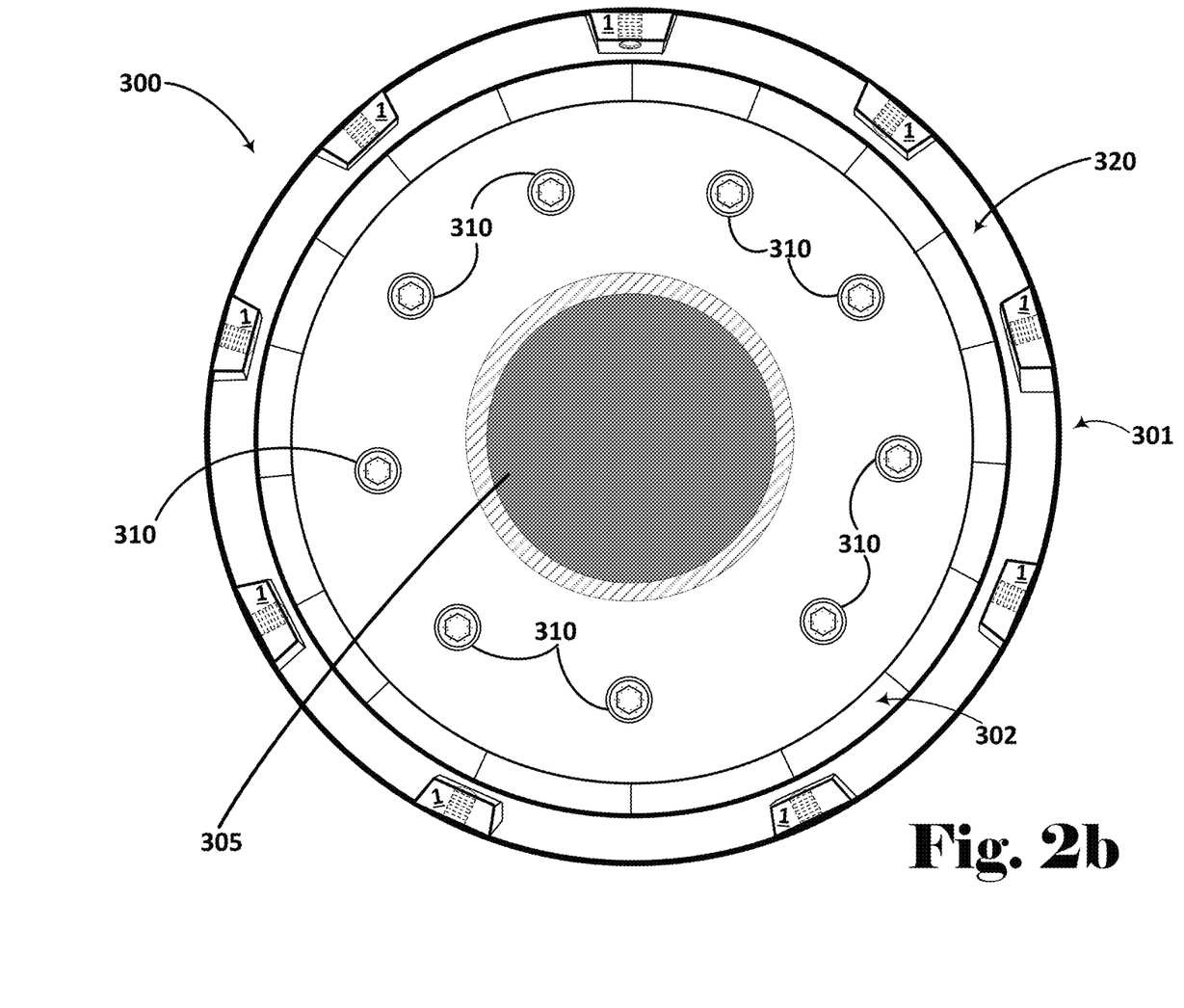
FIG. 2b is a reduced magnification of the top perspective view of an example of the lower portion of an aircraft's landing gear wheel hub half showing the opening at the bottom of the wheel hub half as a darkened circle (also shown as a darkened circle in FIG. 2c).
Figure 2C:
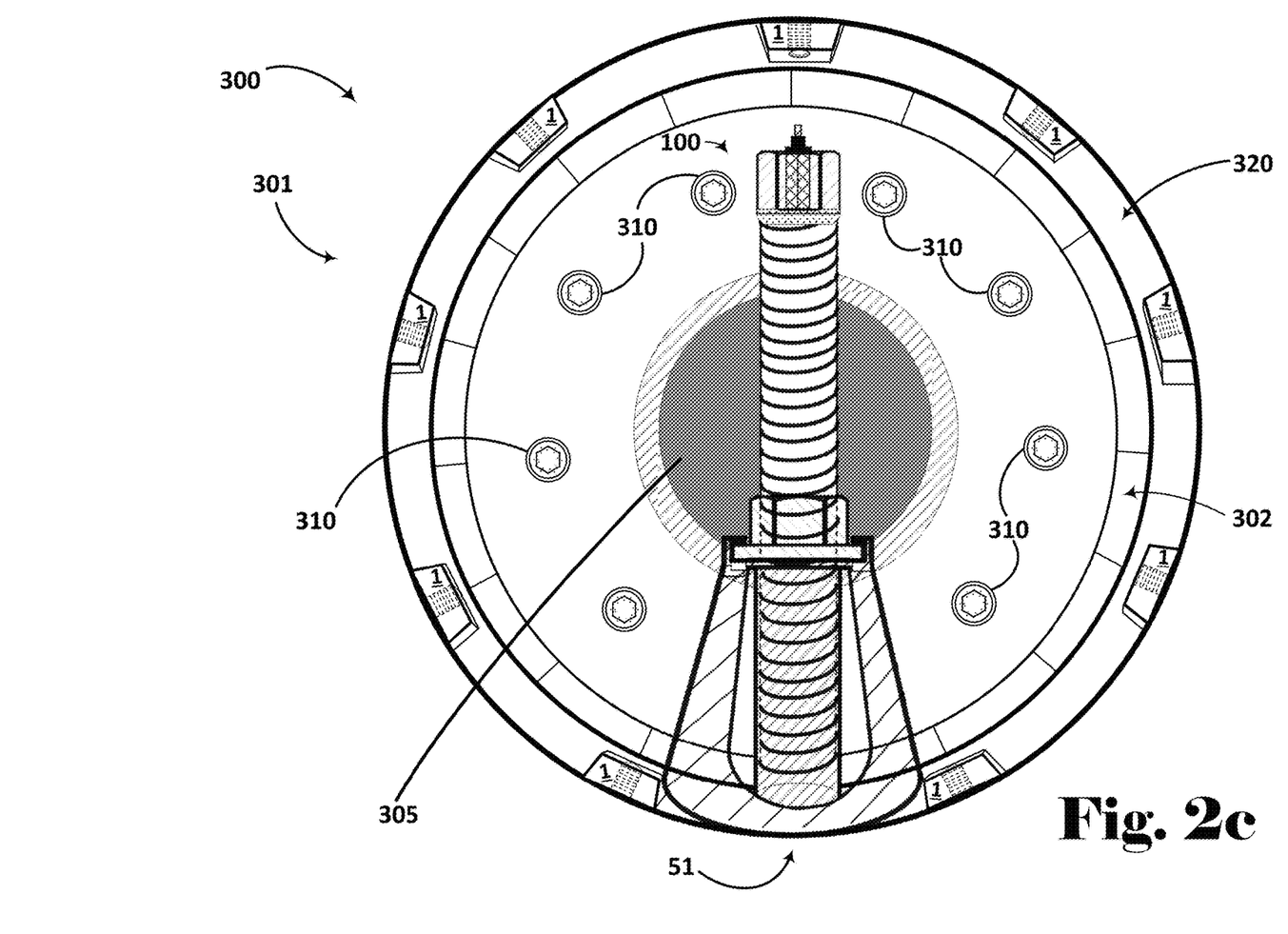
FIG. 2c is a reduced magnification of the top perspective view of a wheel hub half showing both the upper and lower portions of the wheel hub half, and showing the device and system located on the upper portion with the device base located between two brake key mounts and the end of the device opposite the device base (i.e., the bit holder and screw driver bit end) aligned to engage a brake key screw (not shown) in accordance with a preferred embodiment of the present invention.

Now referring to FIG. 2b, an example of an aircraft landing gear wheel hub half is shown. The Wheel Hub Half 300 is essentially a cylindrical can with an open top and a smaller circular opening on the bottom 305. The Brake Key Mounts 1 are attached to the upper portion of the inner Wheel Hub Half 300, above a cylindrical ledge portion 320 located on the lower portion of the inner side of the Wheel Hub Half 300 (the cylindrical ledge portion 320 is also shown in FIG. 2a and FIG. 2c). Also shown are hex bolts 310 used to secure the Wheel Hub Half 300 to other equipment/parts not relevant to this discussion.

Referring again to FIG. 2a, it is shown that, except for one Brake Key Screw 150, all other Brake Key Screws 150 have been retracted, i.e., not inserted through the Brake Key 200 and into the respective Brake Key Mount 1.

As background: the prior art, i.e., old, method to remove a stuck Brake Key Screw 150 generally included the use of a socket wrench, an impact driver, and a hammer (to attempt to firmly set the tip of the screw driver bit into the screw head of the Brake Key Screw 150), to apply force to the head of the stuck screw while attempting to twist the Brake Key Screw 150 out, i.e., rotate the stuck Brake Key Screw 150 in the direction to extract the Brake Key Screw 150 from the Brake Key Mount 1. More specifically, and as an example with respect to the use of the device 10 and the system 100 with the Wheel Hub Half 300 of the MV-22, the MV-22 Wheel Hub Half 300 only has an 11.5 inch diameter, so it is often difficult to effectively position a screw driver bit 90 bit directly into the screw head of the Brake Key Screw 150. The angle that the screw heads of the Brake Key Screws 150 were hit would often strip the heads of the Brake Key Screws 150, which would then require a technician to drill out the Brake Key Screw 150 from the Brake Key Mount 1.

Still referring to FIG. 2a (and in parts also to FIG. 2c), the following is a non-limiting example to illustrate the use of the device 10 and the system 100 with a MV-22's landing gear wheel hub half. More specifically, the Brake Key Screw 150 shown at the top of the Wheel Hub Half 300 is stuck/frozen to the Brake Key Mount 1 threads or, in other words, are so tightly engaged that the use of standard tools cannot remove the stuck Brake Key Screw 150 without, or possibly without, the screw head of the Brake Key Screw 150 and/or the threads of the Brake Key Mount 1 from being damaged, e.g., stripped. Continuing with the operational use of the device 10 and system 100 example, the removal of the stuck Brake Key Screw 150 from the Brake Key Mount 1, is implemented by: inserting the screw driver bit 90 of the type that matches the screw head slot of the Brake Key Screw 150 into the bit holder 20; placing the device 10 into the Wheel Hub Half 300 so that the curvature of the device base bottom 51 (see, FIG. 1a) aligns with the curvature of the inner portion of the Wheel Hub Half 300 and is located between Brake Key Mounts 1 on the side of the Wheel Hub Half 300 opposite the side of the stuck Brake Key Screw 150. The threaded rod 30 is then rotated either by turning the threaded rod 30 or the coupling nut 40 to helically advance the threaded rod 30 toward the Brake Key Screw 150 until it is sufficiently advanced so that the base bottom 51 and screw driver bit 90 are respectively engaging the inner portion of the wheel hub half 300 and the head of the Brake Key Screw 150. Preferably, prior to applying pressure to the screw head slot of the Brake Key Screw 150, the device 10 is aligned so that the device's base end 51 and the screw bit 90 can become optimally engaged (i.e., the centerline of the base end 51, the threaded rod 30, and the screw removal bit 90 are all aligned in the direction of the centerline between the screw head and screw tip (i.e., the end opposite the screw head)). After this alignment and partial engagement of the Brake Key Screw 150, the threaded rod 30 and screw driver bit 90 are helically advanced by turning the coupling nut 40 in the appropriate direction by using a tool, e.g., an open-end wrench or spanner, until the screw bit 90 is securely, and optimally engaged with the head of the Brake Key Screw 150. After the screw driver bit 90 and the head of the Brake Key Screw 150 are securely engaged with each other, the bit holder 20 is turned in the appropriate Brake Key Screw 150 removal direction by using a tool, e.g., an open-end wrench or spanner until the Brake Key Screw 150 is either removed or loosened to the degree that the Brake Key Screw 150 can be removed, for example without limitation, by using one's fingers.

Referring now to FIG. 2c, both the upper portion 301 and the lower portion 302 of a wheel hub half 300, along with the inventive system 100 are shown. Also shown, the system 100 is operationally pre-positioned, i.e., the device base 51 is positioned on the inner side of the upper portion 301 of the wheel hub half 300 so that the curvature of the device base bottom 51 aligns with the curvature of the inner portion of the Wheel Hub Half 300 and is located between Brake Key Mounts 1 on the side of the Wheel Hub Half 300 opposite the side of the Brake Key Mount 1 having a stuck Brake Key Screw 150 (stuck brake key screw 150 is not shown).

Figure 2D:
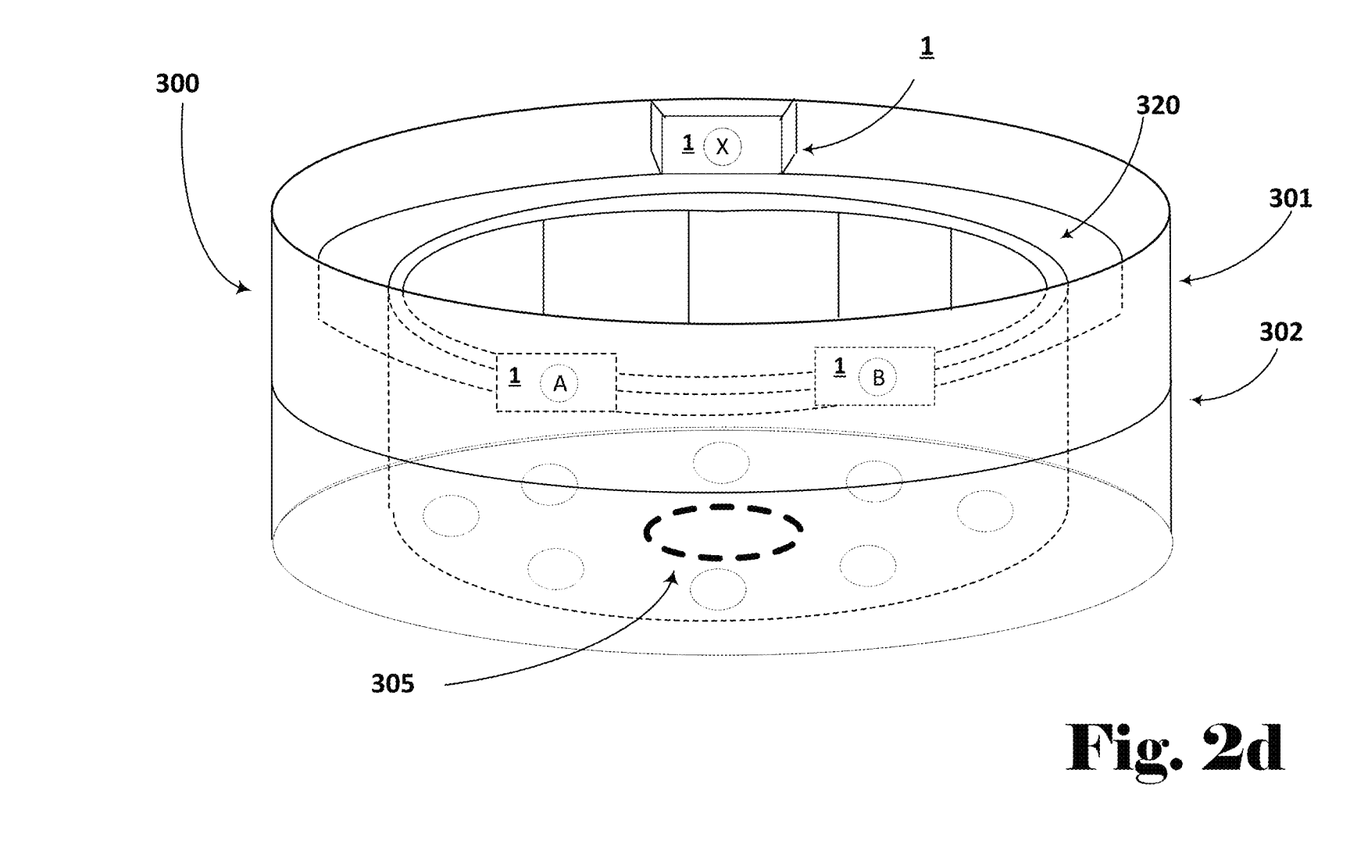
FIG. 2d is a side view of a simplified example of a wheel hub half showing only three brake key mounts, wherein the device base would be positioned between the two brake key mounts marked as A and B, and wherein the end of the device opposite the device base could be hypothetically used to engage a stuck screw in the brake key mount marked as X.
Figures 3A, 3B, 3C, 3D, 3E:
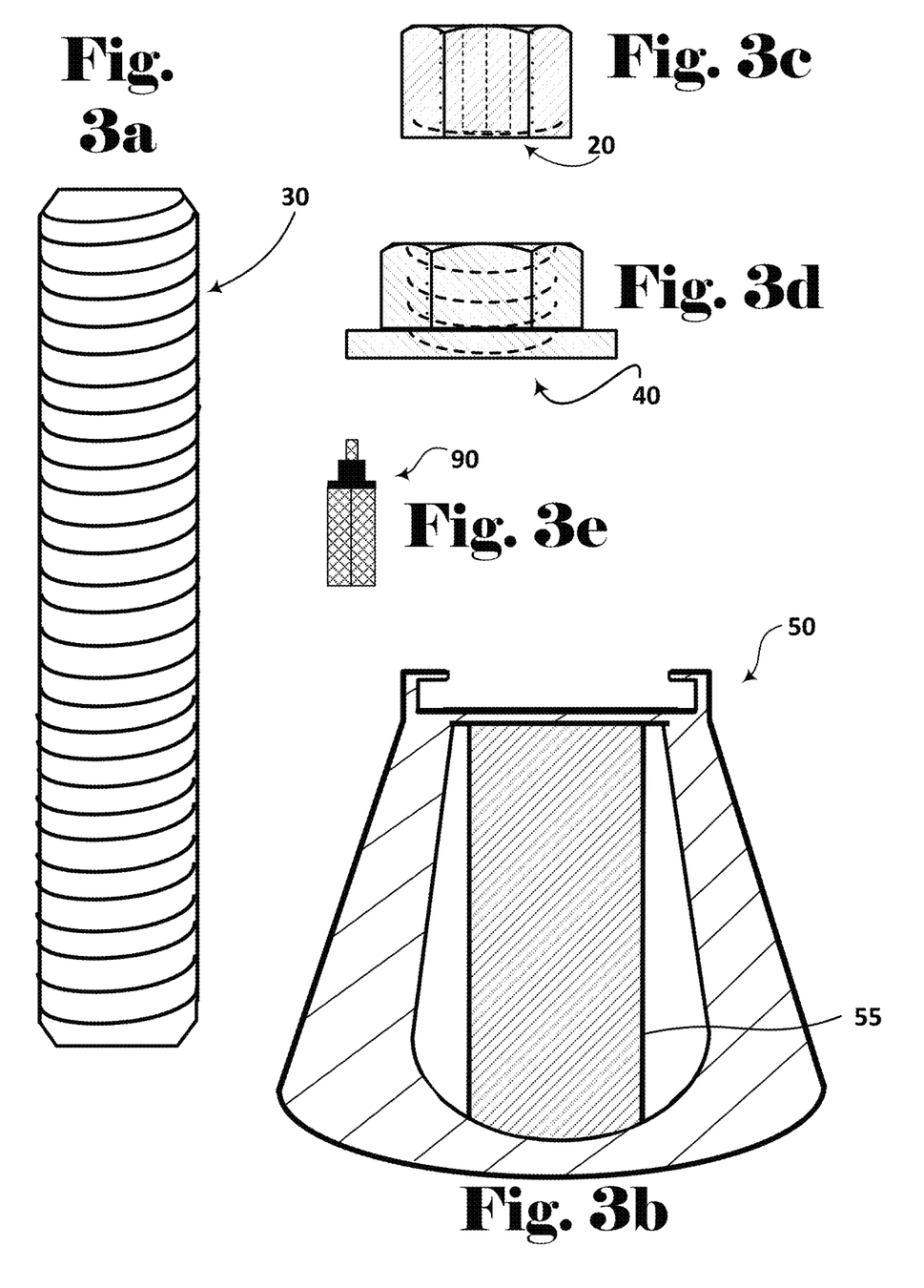
FIG. 3a is a side perspective view of the threaded rod in accordance with a preferred embodiment of the present invention.
FIG. 3b is a front (or back) perspective view of the device base showing the device bottom, side arms, and the coupling nut bracket in accordance with a preferred embodiment of the present invention.
FIG. 3c is a side perspective view of the device's screw driver bit holder showing the internally located screw driver bit shank holding compartment and (optionally) at least one thread for engaging the top of a threaded rod in accordance with a preferred embodiment of the present invention.
FIG. 3d is a side perspective view of the device's threaded coupling nut showing the bottom flange portion that is capable of being operationally located within the coupling nut bracket of the device base in accordance with a preferred embodiment of the present invention.
FIG. 3e is a side perspective view of a slot-type screw driver bit having a hex-shaped shank, which is an example of one of a myriad of bit types that can be inserted into the bit holder of the invention, and when a driver bit is inserted forms the inventive system in accordance with a preferred embodiment of the present invention.

Now referring to FIG. 2d, a side perspective view of a simplified example of an aircraft wheel hub half 300 is shown. Only three Brake Key Mounts 1 are shown in this example to describe the positioning of the inventive system 100 in relation to this side view. An operational description regarding the use of the inventive system 100 includes having the device base 51 (see, e.g., FIG. 1a) positioned between the two brake key mounts marked as A and B, and wherein the end of the device opposite the device base 51 (i.e., the screw driver bit 90, see, e.g., FIG. 1a) could be operationally advanced to engage a stuck Brake Key Screw 150 (see, e.g., FIG. 2a) in the Brake Key Mount 1 marked as X.

While the present invention has been particularly shown, and both the present invention and method of use were described with reference to the preferred embodiments and various aspects thereof, it will be appreciated by those of ordinary skill in the art that various changes and modifications may be made without departing from the spirit and scope of the invention. The preferred embodiments and the best mode of the present invention are described herein. However, it should be understood that the best mode for carrying out the invention herein described is by way of illustration and not by way of limitation. Therefore, it is intended that the scope of the present invention includes all of the modifications that incorporate its principal design features, and that the scope and limitations of the present invention should be determined by at least the scope of the appended claims, the drawings, and their equivalents.

What is claimed is:

1. A stuck screw removal device, comprising:
   A device base, wherein the device base is formed to comprise:
      a device base bottom;
      right side and left side arms;
      a center storage compartment; and
      a coupling nut bracket;
   A coupling nut, wherein the coupling nut is designed to operationally fit into the coupling nut bracket;
   A threaded rod having a top and a bottom, wherein the bottom of the threaded rod is inserted through the coupling nut and is partially stored in the storage compartment; and
   A screw driver bit holder, wherein the screw driver bit holder is securely attached to the top of the threaded rod, wherein the screw driver bit holder is designed to accept hex-shanked screw driver bits.

2. The stuck screw removal device of claim 1, wherein the device base bottom is formed to have the same curvature as the inner surface of a wheel hub half.

3. The stuck screw removal device of claim 2, wherein the coupling nut is threaded, and wherein the threaded rod is threaded through the coupling nut when the threaded rod is at least partially inserted into the center storage compartment.

4. The stuck screw removal device of claim 2, wherein the stuck screw removal device is configured to remove stuck brake key screws on a MV-22's landing gear wheel hub half.

5. The stuck screw removal device of claim 2, wherein the device base is made of plastic.

6. The stuck screw removal device of claim 5, wherein the device base is made of high tensile strength plastic.

7. The stuck screw removal device of claim 5, wherein the device base is made of high impact strength plastic.

8. An aircraft landing gear's wheel hub half stuck brake key screw removal system, comprising:
   A device base, wherein the device base is formed to comprise:
      a device base bottom;
      right side and left side arms;
      a center storage compartment; and
      a coupling nut bracket;
   A coupling nut, wherein the coupling nut is designed to operationally fit into the coupling nut bracket;

A threaded rod having a top and a bottom, wherein the bottom of the threaded rod is inserted through the coupling nut and is partially stored in the storage compartment;

A screw driver bit holder, wherein the screw driver bit holder is securely attached to the top of the threaded rod, wherein the screw driver bit holder is designed to accept hex-shanked screw driver bits; and A screw driver bit, wherein the screw driver bit is of the type configured to fit into the slot of the head of a stuck brake key screw.

9. An aircraft landing gear's wheel hub half stuck brake key screw removal system of claim 8, wherein the stuck brake key screw removal system is configured to remove stuck brake key screws on a MV-22's landing gear wheel hub half.

10. A method for using a stuck brake key removal device comprising the steps of:

Inserting a brake key removal device comprising:
- a device base, wherein the device base is formed to comprise:
  - a device base bottom;
  - right side and left side arms;
  - a center storage compartment; and
  - a coupling nut bracket;
- A coupling nut, wherein the coupling nut is designed to operationally fit into the coupling nut bracket;
- A threaded rod having a top and a bottom, wherein the bottom of the threaded rod is inserted through the coupling nut and is partially stored in the storage compartment;
- A screw driver bit holder, wherein the screw driver bit holder is securely attached to the top of the threaded rod, wherein the screw driver bit holder is designed to accept hex-shanked screw driver bits; and
- A screw driver bit, wherein the screw driver bit is of the type configured to fit into the slot of the head of a stuck brake key screw;

Inserting an appropriate screw driver bit into the screw driver bit holder;

Helically advancing the threaded rod, the screw driver bit holder and the screw driver bit until the screw driver bit is partially engaged with the slot on the head of the stuck brake key screw;

Securely engaging the screw driver bit into the slot on the head of the stuck brake key screw by rotating the coupling nut to further helically advance the threaded rod, the bit holder, and the screw bit; and Removing the stuck brake key screw by rotating the bit holder to cause the threaded rod and screw driver bit to helically retract, i.e., move in the direction to extract the brake key screw.

* * * * *